United States Patent
Tsuji et al.

(10) Patent No.: US 11,637,782 B2
(45) Date of Patent: *Apr. 25, 2023

(54) VEHICLE ON-BOARD COMMUNICATION DEVICE AND COMMUNICATION METHOD

(71) Applicant: TOYOTA JIDOSHA KABUSHIKI KAISHA, Toyota (JP)

(72) Inventors: Keisuke Tsuji, Nissin (JP); Kunihiro Miyauchi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,095

(22) Filed: Jun. 24, 2022

(65) Prior Publication Data

US 2022/0321487 A1 Oct. 6, 2022

Related U.S. Application Data

(63) Continuation of application No. 16/945,034, filed on Jul. 31, 2020.

(30) Foreign Application Priority Data

Sep. 5, 2019 (JP) .............................. JP2019-162239

(51) Int. Cl.
  *H04L 47/27* (2022.01)
  *H04L 47/10* (2022.01)
  *H04L 12/40* (2006.01)

(52) U.S. Cl.
  CPC .............. *H04L 47/27* (2013.01); *H04L 47/13* (2013.01); *H04L 2012/40215* (2013.01); *H04L 2012/40273* (2013.01)

(58) Field of Classification Search
  CPC ..................... H04L 47/27; H04L 47/13; H04L 2012/40215; H04L 2012/40273
  See application file for complete search history.

(56) References Cited

U.S. PATENT DOCUMENTS

| 10,103,996 | B2 * | 10/2018 | Camacho ............ H04L 47/2416 |
| 2015/0207745 | A1 | 7/2015 | Funabashi |

(Continued)

FOREIGN PATENT DOCUMENTS

| CN | 111989658 A | 11/2020 | |
| CN | 111989658 A * | 11/2020 | ........... B60R 16/023 |

(Continued)

OTHER PUBLICATIONS

Mar. 24, 2022 Office Action issued in U.S. Appl. No. 16/945,034.
Sep. 14, 2022 Notice of Allowance issued in U.S. Appl. No. 16/945,034.

*Primary Examiner* — Shean Tokuta
(74) *Attorney, Agent, or Firm* — Oliff PLC

(57) ABSTRACT

At this time, a communication line load transmission interval deciding unit selects a transmission interval from the load of the bus. An instrument load transmission interval deciding unit selects a transmission interval from the processing loads of at least one of the vehicle on-board instrument and the gateway. A delivery control unit compares the transmission interval selected by the communication line load transmission interval deciding unit with the transmission interval selected by the instrument load transmission interval deciding unit, and performs control so that the divided updating data is delivered at transmission intervals which are equal to or greater than the longer of these transmission intervals.

9 Claims, 12 Drawing Sheets

(56) References Cited

U.S. PATENT DOCUMENTS

| | | |
|---|---|---|
| 2018/0373522 A1 | 12/2018 | Kontani et al. |
| 2019/0275891 A1* | 9/2019 | Shi .................. G07C 5/008 |
| 2020/0057628 A1 | 2/2020 | Sano |
| 2021/0075735 A1* | 3/2021 | Tsuji ................ G06F 9/505 |
| 2021/0103438 A1* | 4/2021 | Itatsu ............... G06F 13/00 |
| 2021/0155176 A1 | 5/2021 | Harata et al. |
| 2021/0157573 A1 | 5/2021 | Abe et al. |
| 2021/0182049 A1* | 6/2021 | Harata .............. B60W 50/14 |
| 2022/0179641 A1 | 6/2022 | Harata et al. |
| 2022/0179643 A1 | 6/2022 | Harata et al. |
| 2022/0179644 A1 | 6/2022 | Harata et al. |

FOREIGN PATENT DOCUMENTS

| | | | | |
|---|---|---|---|---|
| CN | 112449000 A | | 3/2021 | |
| CN | 112449000 A | * | 3/2021 | ............... G06F 8/65 |
| CN | 112654963 A | | 4/2021 | |
| CN | 112654963 A | * | 4/2021 | ........... B60W 50/00 |
| EP | 3792751 A1 | | 3/2021 | |
| EP | 3792751 A1 | * | 3/2021 | ............... G06F 8/65 |
| JP | 2015136065 A | * | 7/2015 | ............. H04L 47/27 |
| JP | 2017-123012 A | | 7/2017 | |
| JP | 2020027628 A | * | 2/2020 | ......... B60R 16/0231 |
| JP | 2020027671 A | | 2/2020 | |
| JP | 2020028121 A | * | 2/2020 | ............. B60W 20/10 |
| JP | 202136065 A | | 3/2021 | |
| JP | 2021039681 A | * | 3/2021 | ............... G06F 8/65 |
| JP | 2021039681 A | | 3/2021 | |
| WO | 2018088505 A1 | | 5/2018 | |
| WO | WO-2018088505 A1 | * | 5/2018 | ............. B60R 16/02 |
| WO | 2018/185994 A1 | | 10/2018 | |
| WO | 2019202965 A1 | | 10/2019 | |
| WO | WO-2019202965 A1 | * | 10/2019 | ........... B60R 16/023 |
| WO | WO-2020032043 A1 | * | 2/2020 | ......... B60R 16/0231 |
| WO | WO-2020032200 A1 | * | 2/2020 | ........... B60R 16/023 |
| WO | 2021039326 A1 | | 3/2021 | |
| WO | 2021039795 A1 | | 3/2021 | |
| WO | 2021039796 A1 | | 3/2021 | |

* cited by examiner

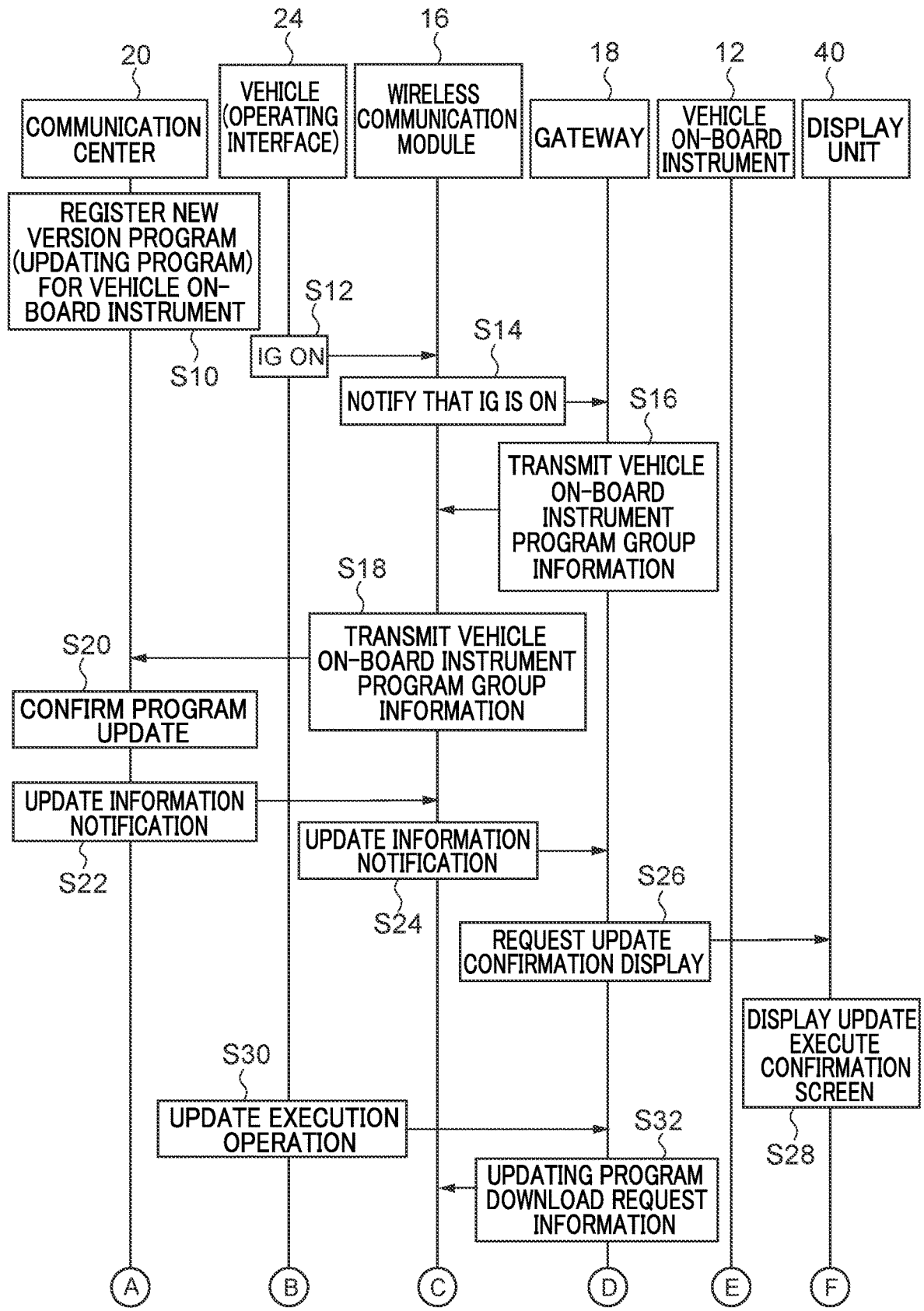

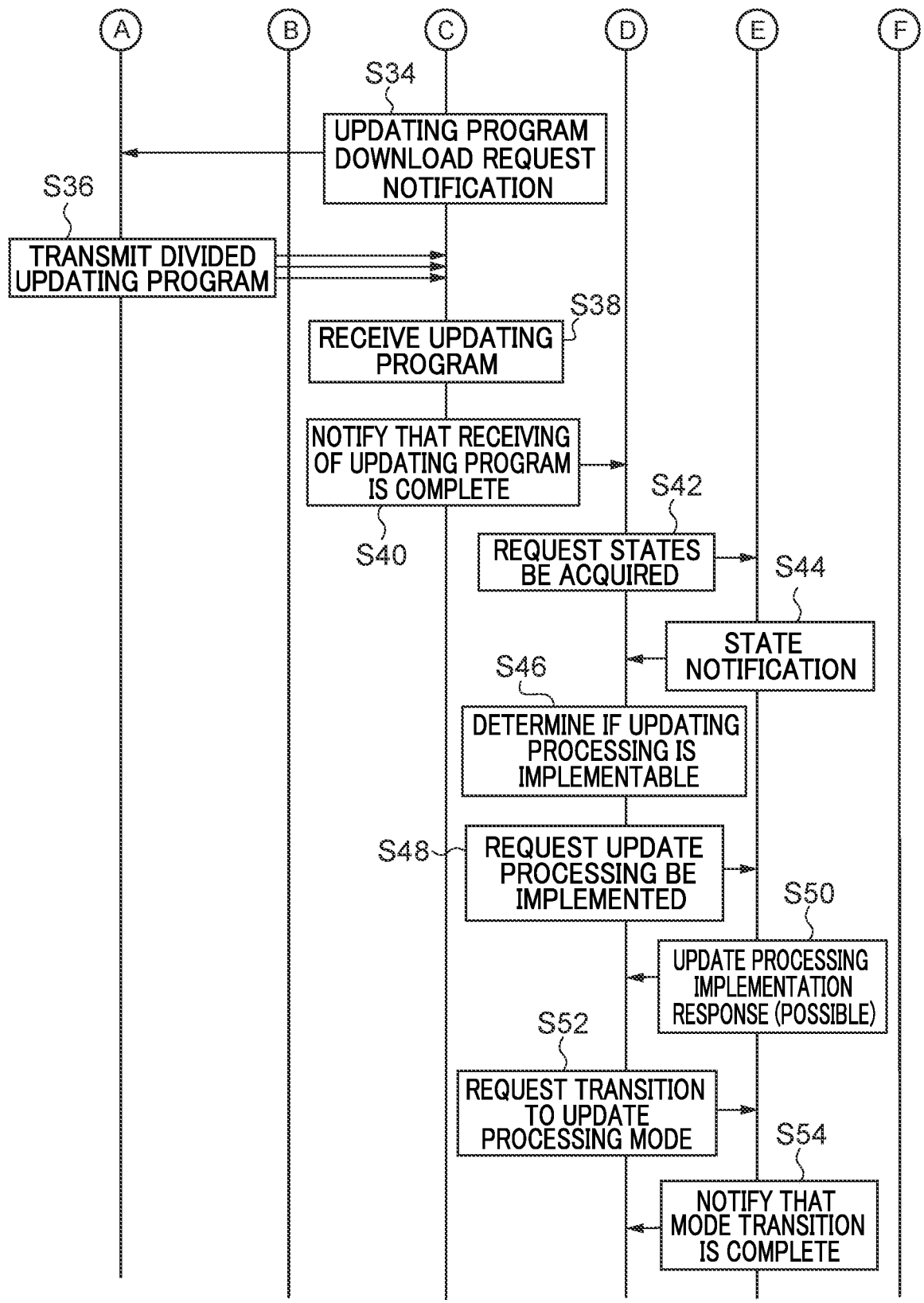

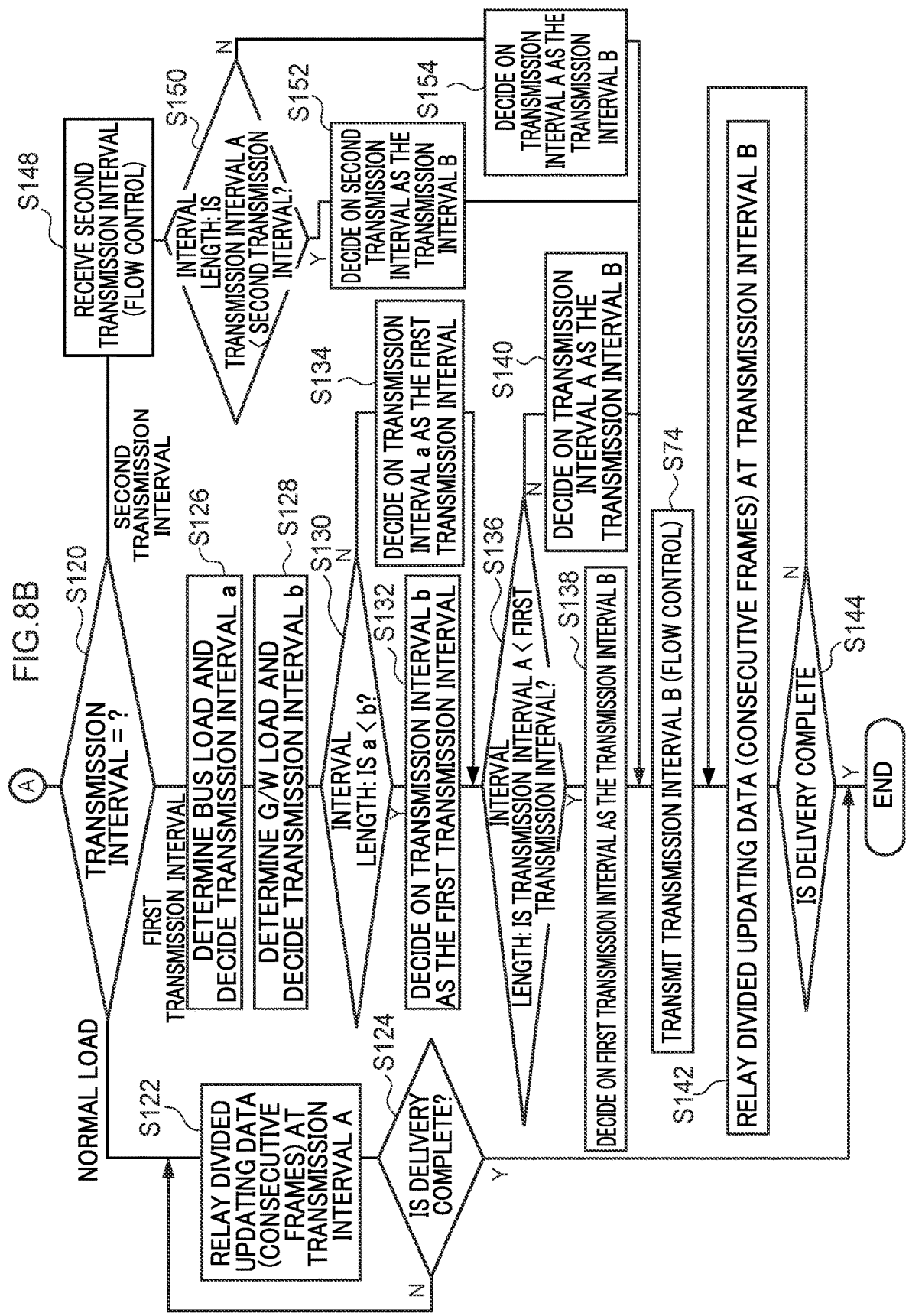

VEHICLE ON-BOARD COMMUNICATION DEVICE AND COMMUNICATION METHOD

CROSS-REFERENCE TO RELATED APPLICATION

This application a continuation of U.S. application Ser. No. 16/945,034 filed on Jul. 31, 2020, which is based on and claims priority under 35 USC 119 from Japanese Patent Application No. 2019-162239 filed on Sep. 5, 2019, the disclosures of which are incorporated by reference herein.

BACKGROUND

Technical Field

The present disclosure relates to a vehicle on-board communication device and communication method.

Related Art

An invention relating to a vehicle on-board updating device is disclosed in Japanese Unexamined Patent Application (JP-A) No. 2017-123012 (Patent Document 1). In this vehicle on-board updating device, updating processing of an ECU that is connected to a communication line is achieved as a result of a relay device transmitting updating data via the communication line to the ECU. The relay device determines the communication state of the communication line, and divides the updating data between plural communication lines in accordance with the result of this determination, thereby enabling the ECU updating processing to be performed efficiently.

However, in the case of the structure disclosed in Patent Document 1, if the processing load of the relay device increases, there is a possibility that delays will be generated when the relay device is transmitting the updating data via the communication line. In conjunction with this, there is also a possibility that delays will also be generated in the transmission of control data that is transmitted and received by vehicle on-board devices in order to control the vehicle, and that this will have an effect on operations of that vehicle. Accordingly, there is room for improvement in the above-described prior technology regarding these points.

SUMMARY

The present disclosure was conceived in view of the above-described circumstances and it is an object thereof to provide a vehicle on-board communication device and communication method that enable updating processing to be performed without this having any effect on vehicle operations.

A vehicle on-board communication device according to a first aspect has vehicle on-board instruments that are mounted in a vehicle and are connected to a communication line, and that have a storage that stores data, an acquisition unit that acquires divided updating data that is created by dividing updating data which updates the data stored in the storage of the vehicle on-board instruments, a relay unit that delivers the divided updating data acquired by the acquisition unit to the vehicle on-board instruments via the communication line, an instrument load transmission interval deciding unit that determines a processing load based on a processing state of at least one of the vehicle on-board instruments, the acquisition unit, and the relay unit, and selects a transmission interval for the divided updating data based on this processing load, and a delivery control unit that controls the relay unit such that the divided updating data is delivered to the vehicle on-board instruments at transmission intervals which are equal to or greater than the transmission interval selected by the instrument load transmission interval deciding unit.

According to the first aspect, a vehicle on-board communication device has vehicle on-board instruments, an acquisition unit, a relay unit, an instrument load transmission interval deciding unit, and a delivery control unit. The vehicle on-board instruments are mounted in a vehicle and are connected to a communication line, and also have a storage that stores data. The acquisition unit acquires divided updating data. This divided updating data is created by dividing updating data which is used to update the data stored in the storages of the vehicle on-board devices. The relay unit delivers the divided updating data acquired by the acquisition unit to the vehicle on-board devices via the communication line. During this delivery, the delivery control unit controls the transmission intervals at which this divided updating data is transmitted. More specifically, the instrument load transmission interval deciding unit selects the transmission interval from the processing load of at least one of the vehicle on-board instruments, the acquisition unit, or the relay unit. Additionally, the delivery control unit performs control so as to ensure that the divided updating data is delivered at a transmission interval that is equal to or greater than the transmission interval selected by the instrument load transmission interval deciding unit. Accordingly, because the transmission interval is selected based on the processing loads of the vehicle on-board instruments, the acquisition unit, and the relay unit, it is possible to inhibit a delay in the transmission of control data that is needed for a vehicle to travel that is caused by the delivery of the divided updating data.

A vehicle on-board communication device according to a second aspect is characterized in that, in the first aspect, there is further provided a communication line load transmission interval deciding unit that determines a load of the communication line based on a communication state of the communication line, and selects a transmission interval for the divided updating data based on this load, wherein the delivery control unit compares the transmission interval selected by the communication line load transmission interval deciding unit with the transmission interval selected by the instrument load transmission interval deciding unit, and controls the relay unit such that the divided updating data is delivered to the vehicle on-board instruments at a transmission interval that is equal to or greater than the longer of these transmission intervals.

According to the second aspect, a communication line load transmission interval deciding unit selects a transmission interval from the load of the communication line. Additionally, the delivery control unit compares the transmission interval selected by the communication line load transmission interval deciding unit with the transmission interval selected by the instrument load transmission interval deciding unit, and performs control such that the divided updating data is delivered at a transmission interval that is equal to or greater than the longer of these transmission intervals. Accordingly, because the transmission interval is selected based not only on the processing loads of the vehicle on-board instruments, the acquisition unit, and the relay unit, but also on the load of the communication line, it is possible to inhibit even further a delay in the transmission of control data that is needed for a vehicle to travel that is caused by the delivery of the divided updating data.

A vehicle on-board communication device according to a third aspect is characterized in that, in the first or second aspects, the instrument load transmission interval deciding unit determines a processing load by again acquiring the processing state of at least one of the vehicle on-board instruments, the acquisition unit, and the relay unit after the relay unit has delivered a portion of the divided updating data, and then selects again the transmission interval for the divided updating data based on this new processing load, and the delivery control unit compares the transmission interval for the divided updating data after the divided updating data has been partially delivered with the transmission interval selected again by the instrument load transmission interval deciding unit, and controls the relay unit such that the remaining divided updating data is delivered to the vehicle on-board instruments at a transmission interval that is equal to or greater than the longer of these transmission intervals.

According to the third aspect, the instrument load transmission interval deciding unit again selects the transmission interval for the divided updating data from the processing load of at least one of the vehicle on-board instruments, the acquisition unit, and the relay unit after the relay unit has delivered a portion of the divided updating data, and the delivery control unit compares the transmission interval for the divided updating data after the divided updating data has been partially delivered with the transmission interval selected again by the instrument load transmission interval deciding unit, and performs control such that the remaining divided updating data is delivered at a transmission interval that is equal to or greater than the longer of these transmission intervals. Accordingly, even if the processing load of at least one of the vehicle on-board instruments, the acquisition unit, and the relay unit increases as a result of the divided updating data being delivered, it is still possible to alter the transmission interval in accordance with this. Because of this, it is possible to inhibit a delay in the transmission of control data that is needed for a vehicle to travel that is caused by the delivery of the divided updating data.

A vehicle on-board communication device according to a fourth aspect is characterized in that, in the invention of the second aspect or of the third aspect which cites the second aspect, the communication line load transmission interval deciding unit determines the load of the communication line by again acquiring the communication state of the communication line after the relay unit has delivered a portion of the divided updating data, and again selects the transmission interval for the divided updating data based on this load, and the delivery control unit compares the transmission interval for the divided updating data after the divided updating data has been partially delivered with the transmission interval selected again by the communication line load transmission interval deciding unit, and controls the relay unit such that the remaining divided updating data is delivered to the vehicle on-board instruments at a transmission interval that is equal to or greater than the longer of these transmission intervals.

According to the fourth aspect, the communication line load transmission interval deciding unit again selects the transmission interval for the divided updating data from the load of the communication line after the relay unit has delivered a portion of the divided updating data, and the delivery control unit compares the transmission interval for the divided updating data after the divided updating data has been partially delivered with the transmission interval selected again by the communication line load transmission interval deciding unit, and performs control such that the remaining divided updating data is delivered at a transmission interval that is equal to or greater than the longer of these transmission intervals. Accordingly, even if the load of the communication line increases as a result of the divided updating data being delivered, it is still possible to alter the transmission intervals in accordance with this. Because of this, it is possible to inhibit a delay in the transmission of control data that is needed for a vehicle to travel that is caused by the delivery of the divided updating data.

A vehicle on-board communication device according to a fifth aspect is characterized in that, in the invention of any one of the first aspect through the fourth aspect, the acquisition unit acquires the divided updating data wirelessly.

According to the fifth aspect, because the acquisition unit acquires the divided updating data wirelessly, when this divided updating data is being acquired, it is not necessary for the vehicle to be stopped. Because of this, it is possible to acquire the divided updating data even when a vehicle is traveling and the like.

A communication method according to a sixth aspect is applied to a vehicle on-board communication device which is provided with vehicle on-board instruments that are mounted in a vehicle and are connected to a communication line, and that have a storage that stores data, an acquisition unit that acquires divided updating data which is created by dividing updating data that updates the data stored in the storage of the vehicle on-board instruments, a relay unit that delivers the divided updating data acquired by the acquisition unit to the vehicle on-board instruments via the communication line, a communication line load transmission interval deciding unit that determines a load of the communication line based on a communication state of the communication line, and selects a transmission interval for the divided updating data based on this load, an instrument load transmission interval deciding unit that determines a processing load based on a processing state of at least one of the vehicle on-board instruments, the acquisition unit, and the relay unit, and selects a transmission interval for the divided updating data based on this processing load, and a delivery control unit that controls a delivery control unit that controls deliveries of the divided updating data by the relay unit. In this communication method, the transmission interval selected by the communication line load transmission interval deciding unit are compared with the transmission interval selected by the instrument load transmission interval deciding unit, and the divided updating data is delivered to the vehicle on-board instruments at a transmission interval that is equal to or greater than the longer of these transmission intervals.

According to the sixth aspect, in the same way as in the invention of the first aspect, the transmission interval selected by the communication line load transmission interval deciding unit is compared with the transmission interval selected by the instrument load transmission interval deciding unit, and the divided updating data is delivered at a transmission interval that is equal to or greater than the longer of these transmission intervals. Accordingly, because the transmission interval is selected based not only on the load of the communication line, but also on the processing loads of the vehicle on-board instruments, the acquisition unit, and the relay unit, it is possible to inhibit a delay in the transmission of control data which is required for a vehicle to travel that is caused by the delivery of the divided updating data.

The vehicle on-board communication device according to the first through fourth aspects has the superior effect of enabling updating processing to be performed without this having any effect on vehicle operations.

The vehicle on-board communication device according to the fifth aspect has the superior effect of enabling updating processing to be performed easily.

The communication method according to the sixth aspect has the superior effect of enabling updating processing to be performed without this having any effect on vehicle operations.

BRIEF DESCRIPTION OF THE DRAWINGS

Exemplary embodiments of the present disclosure will be described in detail based on the following figures, wherein:

FIGS. 6A and 6B show a sequence diagram illustrating a flow of a first half of updating processing of the vehicle on-board communication device according to the first exemplary embodiment;

FIGS. 8A and 8B show a flowchart illustrating a flow of operations of the vehicle on-board communication device according to the first exemplary embodiment.

DETAILED DESCRIPTION

First Exemplary Embodiment

Hereinafter, a first exemplary embodiment of a vehicle on-board communication device according to the present disclosure will be described using FIG. 1 through FIG. 7.

(Overall Structure)

Figure 1:
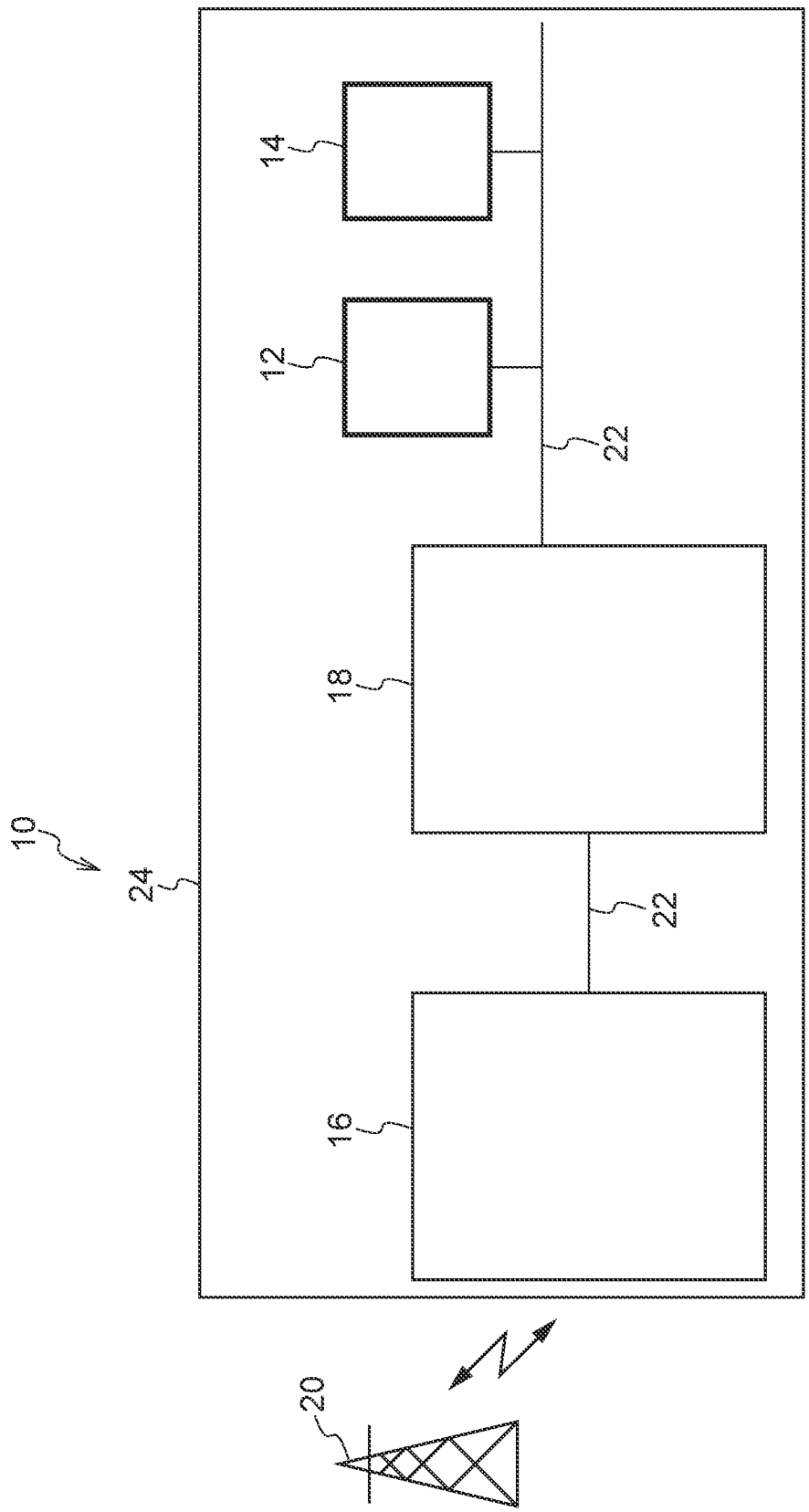
FIG. 1 is a schematic view showing an outline of a vehicle on-board communication device according to a first exemplary embodiment.

FIG. 1 is a view showing the schematic structure of a vehicle on-board communication device 10 according to the present exemplary embodiment.

As is shown in FIG. 1, the vehicle on-board communication device 10 has plural vehicle on-board instruments 12 and 14, a wireless communication module 16, and a gateway 18. The vehicle on-board instruments 12 and 14, the wireless communication module 16, and the gateway 18 are mounted in a vehicle 24. The vehicle on-board instruments 12 and 14, the wireless communication module 16, and the gateway 18 are mutually connected to each other via a bus 22 which serves as a communication line, and are able to mutually exchange information with each other. In addition, the wireless communication module 16 is connected to a communication center 20 that is provided outside the vehicle, and is able to communicate with this communication center 20 via a network N (see FIG. 5). For example, the Internet or a WAN (Wide Area Network) or the like is used for this network N.

The vehicle on-board instruments 12 and 14 are instruments that are used to execute various functions of the vehicle 24. Examples thereof include an air-conditioning unit, an audio device, and an ECU and the like of a car navigation device. The specific structure and actions of the vehicle on-board instruments 12 and 14 are described below.

The wireless communication module 16 has a wireless communication function that enables it to perform communication mutually with the vehicle 24 and the communication center 20 via the network N. The specific structure and actions of the wireless communication module 16 are described below.

The gateway 18 is a device that relays communication between the wireless communication module 16 and the vehicle on-board instruments 12 and 14. When communication is being performed between the wireless communication module 16 and the vehicle on-board instruments 12 and 14, the gateway 18 transmits the communication data while referring to previously recorded communication paths. The specific structure and actions of the gateway 18 are described below.

The communication center 20 receives data from the vehicle 24 via the network N, and also transmits to the vehicle 24 divided updating data which is created by dividing updating data which is used to update vehicle-on-board instrument control programs for the vehicle-on-board instrument 12 which is mounted in the vehicle 24. The specific structure and actions of the communication center 20 are described below.

(Hardware Structure)

Figure 2:
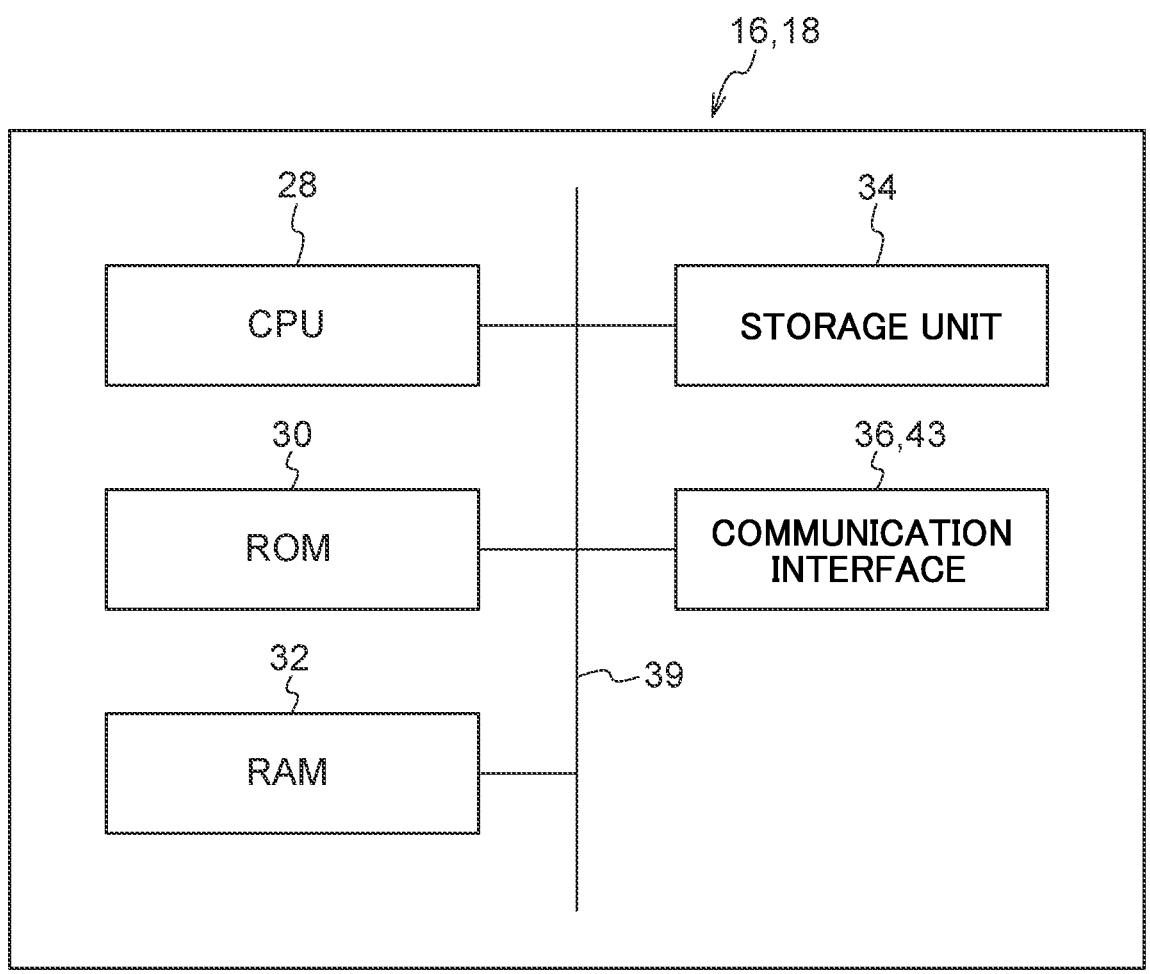
FIG. 2 is a block diagram showing a hardware structure of a wireless communication module and a gateway of the vehicle on-board communication device according to the first exemplary embodiment.

As is shown in FIG. 2, the wireless communication module 16 is formed so as to include a CPU (Central Processing Unit) 28, ROM (Read Only Memory) 30, RAM (Random Access Memory) 32, a storage unit 34, and a communication interface 36. These structures are mutually connected together so as to be able to communicate with each other via a bus 39.

The CPU 28 is a central processing unit and performs tasks such as executing various types of program and controlling the respective units. In other words, the CPU 28 reads a program from the ROM 30 or the storage unit 34, and executes this program using the RAM 32 as a workspace. The CPU 28 controls the respective above-described structures and performs various types of calculation processing in accordance with programs recorded in the ROM 30 or the storage unit 34. In the present exemplary embodiment, as an example, a data delivery program is stored in the ROM 30 or the storage unit 34.

The ROM 30 stores various types of programs and various types of data. The RAM 32 serves as a workspace and temporarily stores programs and data. The storage unit 34 is formed by an HDD (Hard Disk Drive) or an SSD (Solid State Drive), and stores various types of programs including operating systems, and various types of data.

The communication interface 36 is an interface that enables the wireless communication module 16 to communicate with the communication center 20. A Standard such as, for example, FDDI or Wi-Fi (Registered Trademark) is used for the communication interface 36.

Figure 3:
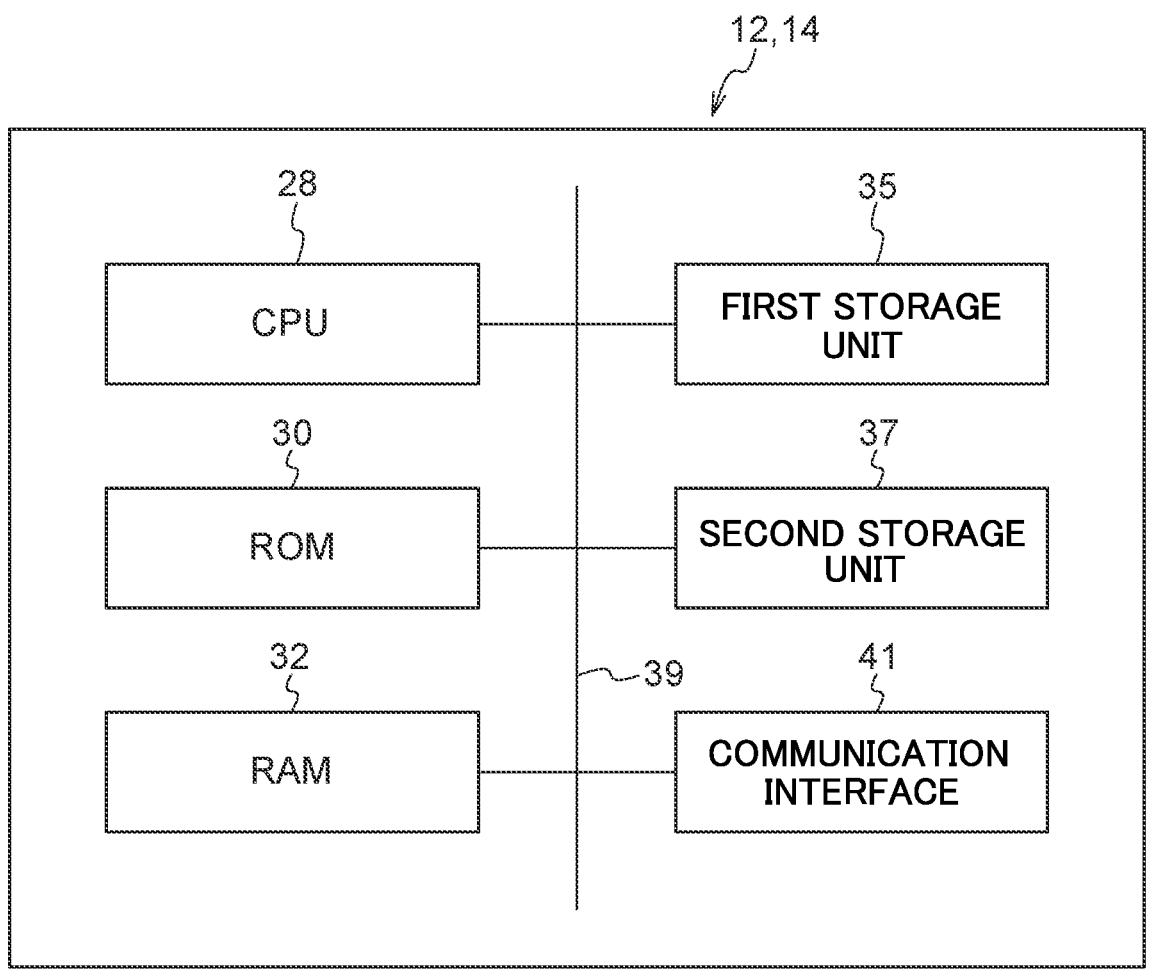
FIG. 3 is a block diagram showing a hardware structure of vehicle on-board instruments of the vehicle on-board communication device according to the first exemplary embodiment.

As is shown in FIG. 3, the vehicle on-board instruments 12 and 14 are each formed so as to include a CPU 28, ROM 30, RAM 32, a first storage unit 35, a second storage unit 37, and a communication interface 41. These structures are mutually connected together so as to be able to communicate with each other via a bus 39. The respective vehicle on-board instrument control programs are stored in the ROM 30, the first storage unit 35, and the second storage unit 37.

The communication interface 41 is an interface that enables the vehicle on-board instruments 12 and 14 to communicate with the gateway 18, and a CAN (Controller Area Network) Standard is used for the communication interface 41.

As is shown in FIG. 2, the gateway 18 is formed so as to include a CPU 28, ROM 30, RAM 32, a storage unit 34, and a communication interface 43. These structures are mutually connected together so as to be able to communicate with each other via a bus 39.

The communication interface 43 is an interface that enables the gateway 18 to communicate with the vehicle on-board instruments 12 and 14 and the wireless communication interface 16, and a CAN Standard is used for the communication interface 43.

Figure 4:
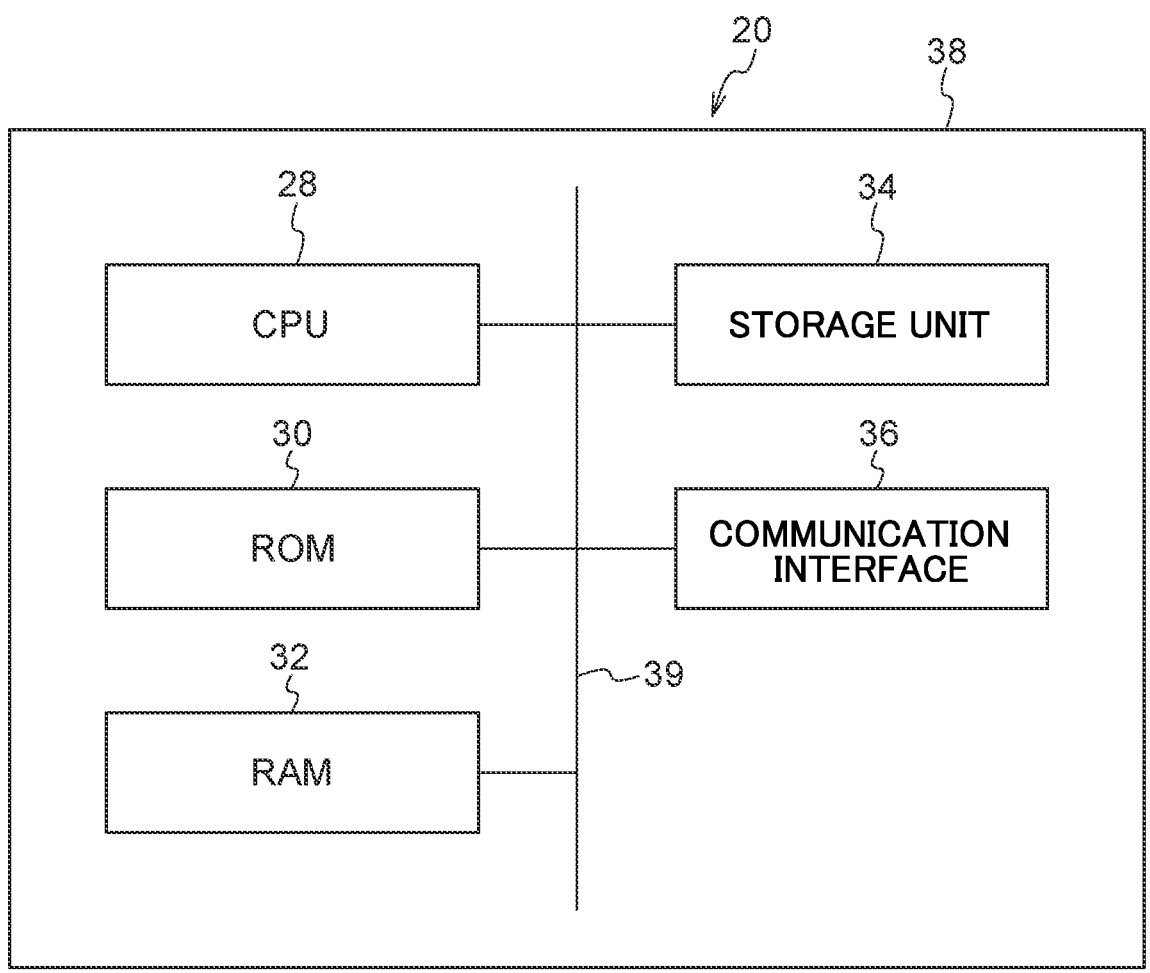
FIG. 4 is a block diagram showing a hardware structure of a server of the vehicle on-board communication device according to the first exemplary embodiment.

As is shown in FIG. 4, the communication center 20 is formed so as to include a server 38 having a CPU 28, ROM 30, RAM 32, a storage unit 34, and a communication interface 36. These structures are mutually connected together so as to be able to communicate with each other via a bus 39.

(Function Structure)

When executing the above-described vehicle on-board instrument updating program, the vehicle on-board device 10 implements various functions while utilizing the above-described hardware resources. The function structure implemented by the vehicle on-board device 10 will now be described.

Figure 5:
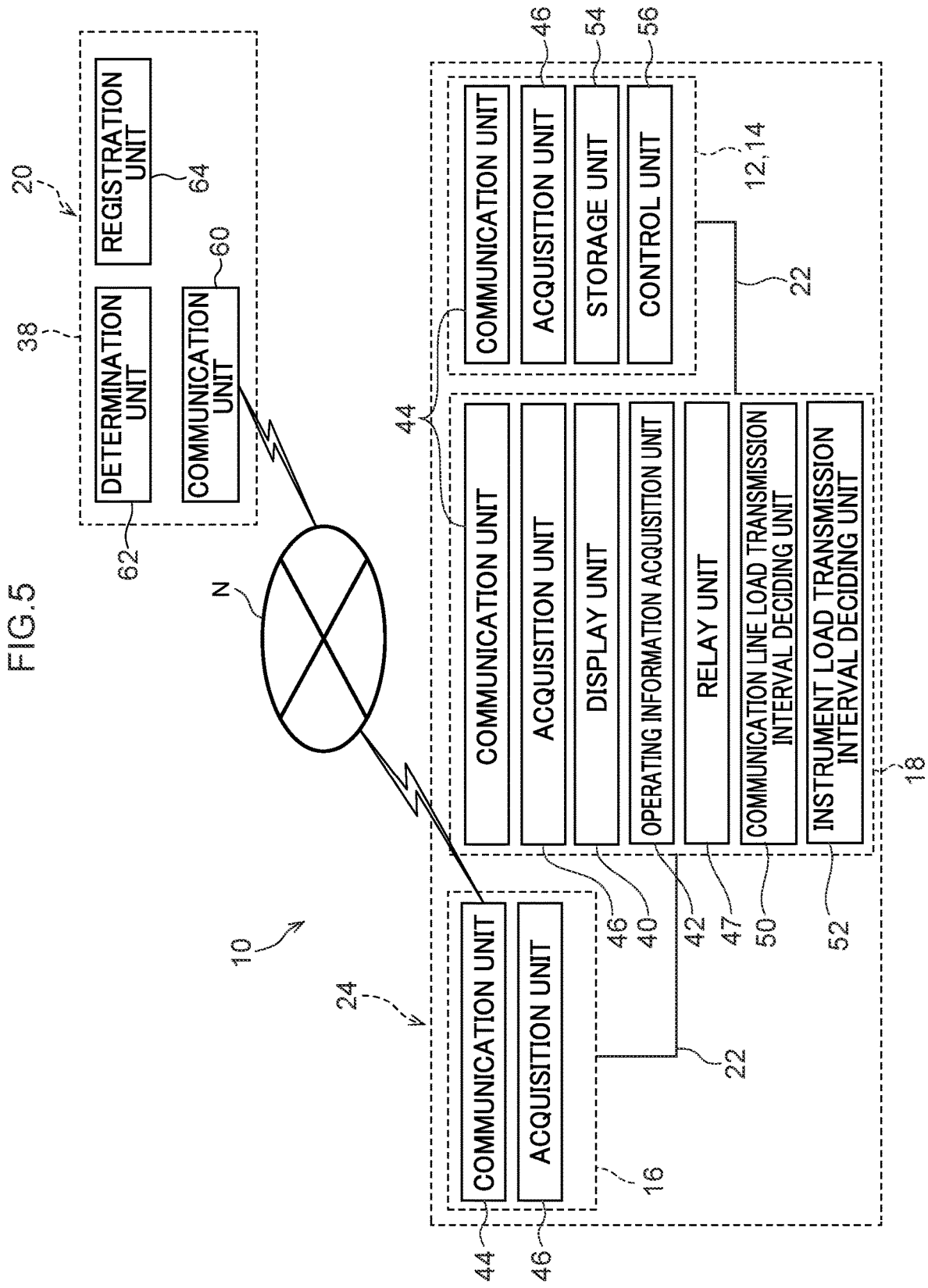
FIG. 5 is a block diagram showing a function structure of the vehicle on-board communication device according to the first exemplary embodiment.

FIG. 5 is a block diagram showing an example of function structures of the vehicle on-board device 10.

(Function Structure of a Vehicle On-Board Communication Device)

As is shown in FIG. 5, as the function structures in the vehicle 24, the vehicle on-board communication device 10 has a display unit 40, an operating information acquisition unit 42, a communication unit 44, an acquisition unit 46, a relay unit 47, a delivery control unit 48, a communication line load transmission interval deciding unit 50, an instrument load transmission interval deciding unit 52, a storage unit 54, and a control unit 56. Each function structure is implemented as a result of each CPU 28 of each of the communication line module 16, the gateway 18, and the vehicle on-board instruments 12 and 14 reading a vehicle on-board instrument updating program stored in the ROM 30 or in the storage units 34, 35, and 37, and then executing this program. More specifically, in the present exemplary embodiment, as an example, the display unit 40, the operating information acquisition unit 42, the relay unit 47, the delivery control unit 48, the communication line load transmission interval deciding unit 50, and the instrument load transmission interval deciding unit 52 are realized as a result of the CPU 28 of the gateway 18 reading and then executing a vehicle on-board instrument updating program stored in the ROM 30 or the storage unit 34. In addition, the storage unit 54 and the control unit 56 are realized as a result of each CPU 28 of each of the vehicle on-board instruments 12 and 14 reading and then executing a vehicle on-board instrument updating program stored in the ROM 30 or the storage units 35 and 37. Furthermore, the communication unit 44 and the acquisition unit 46 are realized as a result of each CPU 28 of each of the wireless communication module 16, the gateway 18, and the vehicle on-board instruments 12 and 14 reading and then executing a vehicle on-board instrument updating program stored in the ROM 30 or the storage units 34, 35 and 37.

The display unit 40 causes various types of information to be displayed on a display device (not shown in the drawings) provided in the vehicle cabin of the vehicle 24. In the present exemplary embodiment, it is possible for a switch asking whether or not to execute the updating processing for each of the vehicle on-board instruments 12 and 14 to be displayed to a vehicle occupant.

The operating information acquisition unit 42 acquires operating information that is input into an operating interface (not shown in the drawings) that is provided in the vehicle cabin of the vehicle 24. The operating interface is formed so as to include an ignition switch (hereinafter, referred to simply as 'IG') that operates the turning ON and turning OFF of a power unit, and input switches that are used to perform execute operations and cancel operations, and the relevant operating information is acquired by this operating interface.

The communication unit 44 performs the transmitting and receiving of information between itself and other devices.

The acquisition unit 46 acquires data from other devices and other function structure units. In other words, the acquisition unit 46 acquires operating information from the operating information acquisition unit 42, and acquires divided updating data from the communication center 20 via the communication unit 44.

The relay unit 47 delivers divided updating data acquired by the acquisition unit 46 to the vehicle on-board instruments 12 and 14 via the bus 22.

The delivery control unit 48 controls the relay unit 47 such that the divided updating data is delivered in predetermined units after predetermined transmission intervals. The transmission interval is decided on by comparing the transmission interval decided on by the communication line load transmission interval deciding unit 50 with the transmission interval decided on by the instrument load transmission interval deciding unit 52, and is equal to or greater than the longer of these transmission intervals.

The communication line load transmission interval deciding unit 50 determines the load of the bus 22 at a predetermined cycle based on the communication state of the bus 22, and then based on this load, decides on a permissible transmission interval for when the divided updating data is being transmitted. More specifically, as an example, the load of the bus 22 is determined from the amount of transmitted and received data per unit time. The communication line load transmission interval deciding unit 50 calculates approximately how close to the communication limit of the bus 22, which has been registered in advance, the current load of the bus 22 has already reached, and then decides on the transmission interval so that this communication limit of the bus 22 is not exceeded.

The instrument load transmission interval deciding unit 52 determines the processing loads of the vehicle on-board instruments 12 and 14 and the gateway 18 based on the processing states of the vehicle on-board instruments 12 and 14 and the gateway 18, and then based on these processing loads, decides on a permissible transmission interval for when the divided updating data is being transmitted. More specifically, as an example, the respective processing loads of each of the vehicle on-board instruments 12 and 14 and the gateway 18 are determined from their respective data processing amounts per unit time. The instrument load transmission interval deciding unit 52 than calculates approximately how close to the processing load limits of each of the vehicle on-board instruments 12 and 14 and the gateway 18, which have been registered in advance, the current processing loads of the vehicle on-board instruments 12 and 14 and the gateway 18 have already reached, and then decides the transmission interval so that the respective processing load limits of the vehicle on-board instruments 12 and 14 and the gateway 18 are not exceeded.

The storage unit 54 stores vehicle on-board instrument control programs which serve as data that is used to control the vehicle on-board instruments 12 and 14.

The control unit 56 causes the vehicle on-board instruments 12 and 14 to operate based on the vehicle on-board instrument control programs stored in the storage unit 54 of the vehicle on-board instruments 12 and 14. In addition, when the IG is switched from an OFF state to an ON state, the control unit 56 controls the communication unit 44 so that information (i.e., version information and the like) for the vehicle on-board instrument control programs stored in the storage unit 54 is transmitted to the communication center 20.

(Function Structure of the Communication Center)

The vehicle on-board communication device 10 has a communication unit 60, a determination unit 62, and a registration unit 64 as function structures in the server 38 of the communication center 20. Each function structure is implemented as a result of the CPU 28 of the server 38 reading vehicle on-board instrument updating programs stored in the ROM 30 or the storage 34 and then executing these programs.

The communication unit 60 transmits and receives information between itself and other devices.

The registration unit 64 registers updating data that is used to update the vehicle on-board instrument control programs (i.e., updating programs that are used to update the vehicle on-board instrument control programs) of the vehicle on-board instruments 12 and 14 in the server 38.

The determination unit 62 analyzes the information of the vehicle on-board instrument control programs of the vehicle on-board instruments 12 and 14 acquired by the communication unit 60, and determines whether or not this information matches the version information of the updating data registered in the server 38 by the registration unit 64. If the result of this determination is that new updating data for the vehicle on-board instrument control programs of the vehicle on-board instruments 12 and 14 is registered in the server 38, then the vehicle 24 is notified that updating data exists. If, in response to this notification, operating information to 'Execute' is acquired from the operating information acquisition unit 42 of the vehicle 24, the communication unit 60 is controlled so as to transmit divided updating data, which is created by dividing the updating data, to the vehicle 24.

(Processing Flow)

Next, a processing flow when updating processing of the vehicle on-board instrument 12 is performed in the vehicle on-board communication device 10 will be described as an example using the sequence diagrams in FIG. 6A, 6B and FIG. 7A, 7B. This processing is performed as a result of the respective CPU 28 of each of the vehicle on-board instrument 12, the wireless communication module 16, the gateway 18, and the server 38 reading a data delivery program from the ROM 30 or the storage units 34, 35, and 37, and then expanding and executing the program in the RAM 32.

As is shown in FIGS. 6A and 6B, in the server 38 (see FIG. 5) of the communication center 20, registration processing to register a new version program (i.e., updating data), which serves as updating data for the vehicle on-board instrument 12, is executed by an operation performed by an administrator (step S10).

When the IG has been switched ON via an operation performed by a user, the operating interface in the vehicle 24 notifies the wireless communication module 16 that the IG has been switched ON (step S12).

When the wireless communication module 16 receives the notification from the operating interface that the IG has been switched ON, the wireless communication module 16 notifies the gateway 18 that the IG has been switched ON (step S14).

When the gateway 18 receives the notification from the wireless communication module 16 that the IG has been switched ON, the gateway 18 transmits version information and the like for the vehicle on-board instrument control programs stored in the first storage unit 35 and the second storage unit 37 to the wireless communication module 16 (step S16).

When the wireless communication module 16 receives the version information and the like for the vehicle on-board instrument control programs from the gateway 18, it transmits this information to the communication center 20 (step S18).

When the communication center 20 receives the version information and the like for the vehicle on-board instrument control programs from the wireless communication module 16, it confirms whether or not the updating data of the relevant vehicle on-board instrument control programs is registered in the server 38 (step S20). If the updating data is registered in the server 38, the communication center 20 notifies the wireless communication module 16 that there is vehicle on-board instrument control program updating data (step S22).

When the wireless communication center 16 receives the notification from the communication center 20 that there is updating data, it sends this notification to the gateway 18 (step S24).

When the gateway 18 receives the notification from the wireless communication module 16 that there is updating data, it sends a notification to the display unit 40 requesting that the display unit 40 provide a display asking a vehicle user to confirm whether or not the vehicle on-board instrument control program should be updated (step S26).

When the display unit 40 receives the notification from the gateway 18 requesting that the display unit 40 provide a display asking for confirmation as to whether or not the update should be made, the display unit 40 provides a display urging the vehicle user to perform an operation so as to input a command on an operating interface as to whether or not the updating processing for the vehicle on-board instrument control program of the vehicle on-board instrument 12 should be executed (step S28).

When the operating interface of the vehicle 24 receives an operating input via an operation performed by the user commanding that the updating of the vehicle on-board instrument control program should be executed, it transmits this information to the gateway 18 (step S30).

When the gateway 18 receives from the operating interface the command to execute the updating, it sends notification to the wireless communication unit 16 requesting that the wireless communication unit 16 download the updating data from the communication center 20 (step S32).

When the wireless communication module 16 receives the notification from the gateway 18 requesting that it download the updating data, the wireless communication module 16 sends notification to the communication center 20 requesting that it transmit the updating data in preparation for the downloading of the updating data (step S34).

When the communication center 20 receives the notification from the wireless communication center 16 requesting that it transmit the updating data, the communication center 20 transmits divided updating data that is created by dividing the updating data into predetermined units to the wireless communication center 16 after predetermined intervals (step S36).

The wireless communication module 16 receives the divided updating data from the communication center 20 and stores it in the storage unit 34 (step S38). Once all of the divided updating data has been received, the wireless communication module 16 notifies the gateway 18 that the receiving of the divided updating data is complete (step S40).

When the gateway 18 receives the notification from the wireless communication module 16 that the receiving of the divided updating data is complete, the gateway 18 executes processing to request from the vehicle on-board instrument 12 information about the processing state of that vehicle on-board instrument 12 (step S42).

When the vehicle on-board instrument 12 receives the request for information about its processing state from the gateway 18, the vehicle on-board instrument 12 sends information about its own processing state and its own operating state and the like to the gateway 18 (step S44).

When the gateway 18 receives from the vehicle on-board instrument 12 the information about the processing state and the like, the gateway 18 determines whether or not it is possible for the updating of the vehicle on-board instrument control program of that vehicle on-board instrument 12 to be performed based on the received information (step S46). If it is determined that the updating of the vehicle on-board instrument control program can be performed, the gateway 18 sends notification to the vehicle on-board instrument 12 requesting that it implement the updating processing for that vehicle on-board instrument control program (step S48).

When the vehicle on-board instrument 12 receives the notification from the gateway 18 requesting that it implement the updating processing for that vehicle on-board instrument control program, the vehicle on-board instrument 12 determines whether or not it is possible to switch from the current processing situation to a mode for performing the updating processing. If such a switch is possible, the vehicle on-board instrument 12 sends notification of this to the gateway 18 (step S50).

When the gateway 18 receives the notification from the vehicle on-board instrument 12 advising that a switch to an updating processing mode is possible, the gateway 18 sends notification to the vehicle on-board instrument 12 requesting that it transition to the updating processing mode (step S52).

When the vehicle on-board instrument 12 receives the notification from the gateway 18 requesting that it transition to the updating processing mode, the vehicle on-board instrument 12 transitions to the updating processing mode and, once this transition is complete, notifies the gateway 18 that the transition has been completed (step S54).

Figure 7A:
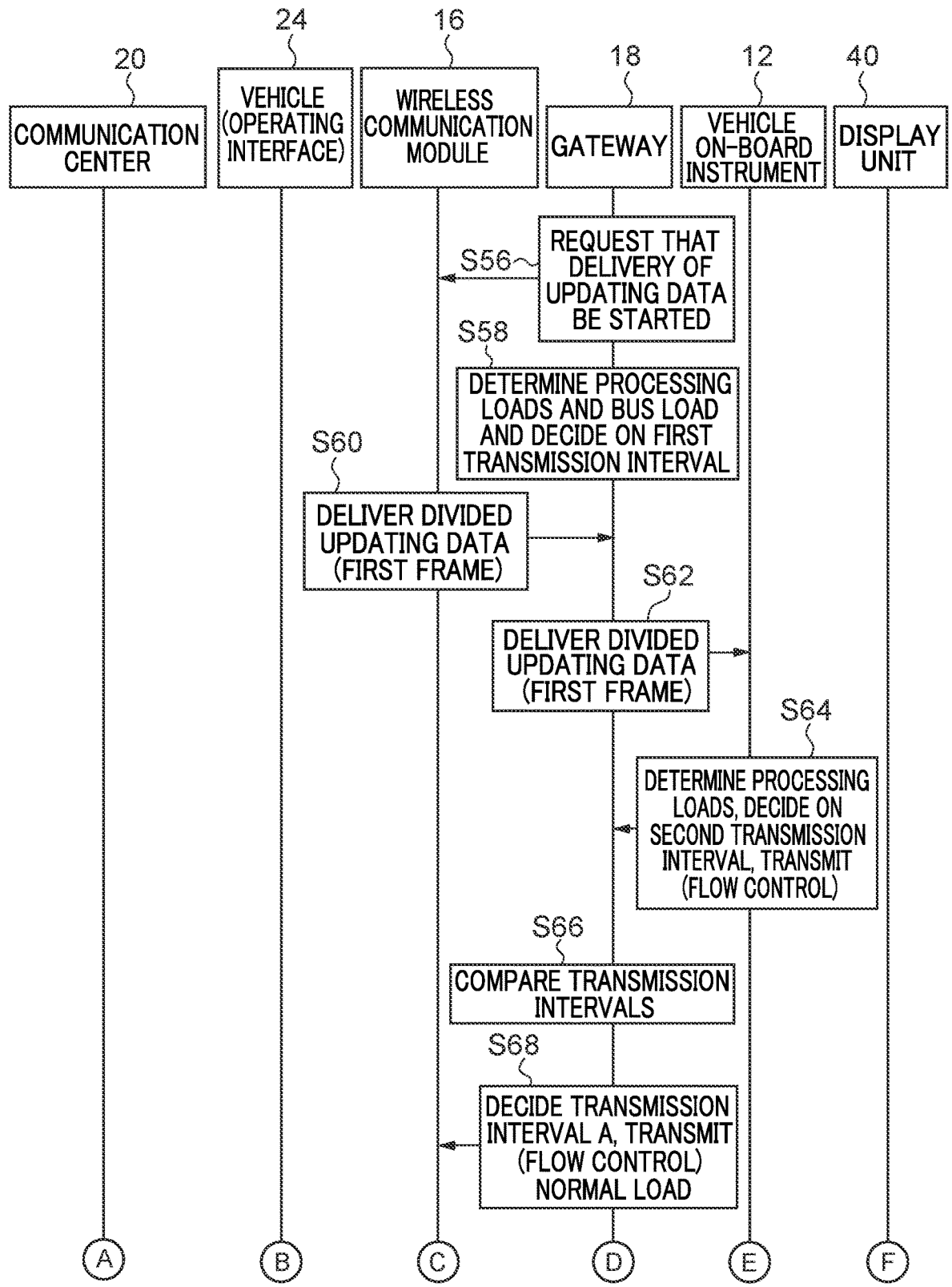
FIGS. 7A and 7B show a sequence diagram illustrating a flow of a second half of updating processing of the vehicle on-board communication device according to the first exemplary embodiment.
Figure 7B:
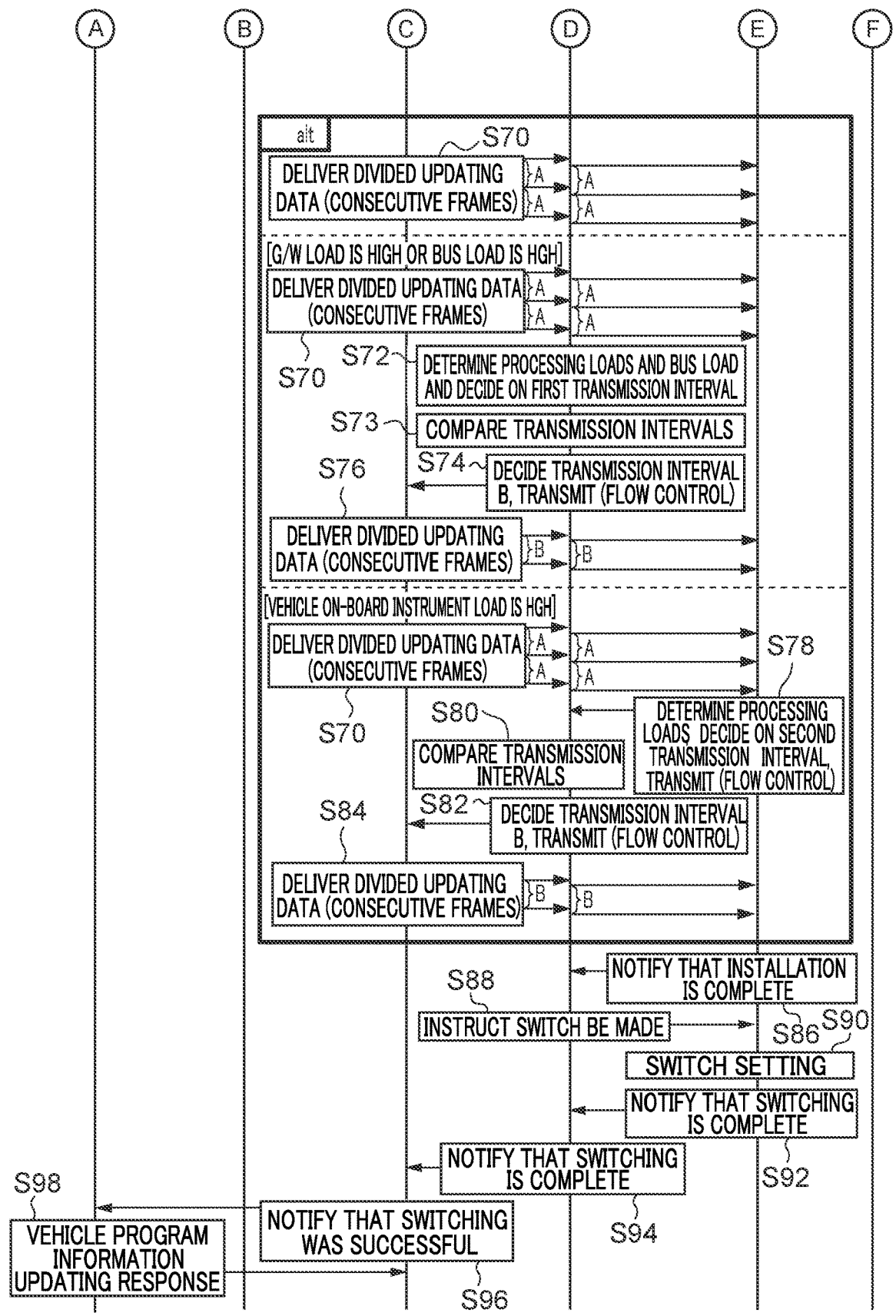

As is shown in FIGS. 7A and 7B, when the gateway 18 receives the notification from the vehicle on-board instrument 12 that the transition has been completed, the gateway 18 sends notification to the wireless communication module 16 requesting that it start delivery of the updating data (step S56). The gateway 18 then determines its own processing load and also the load of the bus 22 from the communication line load transmission interval deciding unit 50 and the instrument load transmission interval deciding unit 52, and calculates a transmission interval (hereinafter, this will be referred to as a 'first transmission interval' in order to distinguish it from other transmission intervals) for the divided updating data that is to be transmitted in divided units (step S58).

When the wireless communication module 16 receives the notification from the gateway 18 requesting that it start distributing the updating data, the wireless communication module 16 starts distributing the divided updating data that is stored in the storage unit 34 (step S60). At this time, the wireless communication module 16 transmits a portion of the divided updating data as a First Frame which is created based on a CAN protocol.

When the gateway 18 receives the portion of the divided updating data from the wireless communication module 16, it relays this data to the vehicle on-board instrument 12 for delivery (step S62).

When the vehicle on-board instrument 12 receives the portion of the divided updating data from the gateway 18, the vehicle on-board instrument 12 determines its own processing load from the instrument load transmission interval deciding unit 52 and, based on this load, decides on a transmission interval (hereinafter, this will be referred to as a 'second transmission interval' in order to distinguish it from other transmission intervals) to be used when transmitting the divided updating data. The vehicle on-board instrument 12 then transmits this transmission interval as a Flow Control which is created based on a CAN protocol (step S64).

When the gateway 18 receives the second transmission interval from the vehicle on-board instrument 12, it compares the first transmission interval with the second transmission interval (step S66). Out of the first transmission interval and the second transmission interval, the gateway 18 then decides on the transmission interval having the longest interval length as the transmission interval A, and then transmits this transmission interval A to the wireless communication module 16 (step S68).

Hereinafter, different processing is performed respectively depending on whether the current state is one of 'the load is normal', or 'the load of the gateway 18 is high or the load of the bus 22 is high', or 'the load of the vehicle on-board instrument 12 is high'. When the transmission interval A decided on by the gateway 18 in step S68 is the same as the first transmission interval, then it is determined that 'the load of the gateway 18 is high or the load of the bus 22 is high'. If, on the other hand, the transmission interval A is the same as the second transmission interval, then it is determined that 'the load of the vehicle on-board instrument 12 is high'. Note that when the transmission interval that is decided on when the load is not high on any of the gateway 18, the bus 22, and the vehicle on-board instrument 12 and the transmission interval A are in substantially the same state, then it is determined that 'the load is normal'. When the load is normal, then when the wireless communication module 16 receives the transmission interval A from the gateway 18 in step S68, the wireless communication module 16 delivers the remaining divided updating data at transmission intervals corresponding to this transmission interval A to the vehicle on-board instrument 12 as Consecutive Frames which are created based on a CAN protocol using the gateway 18 as a relay (step S70).

When the load of the gateway 18 is high or the load of the bus 22 is high, then when the gateway 18 receives the delivery of the divided updating data from the wireless communication module 16 in the above-described step S70, the gateway 18 determines its own processing load once again and also determines the load of the bus 22 once again, and then recalculates the first transmission interval (step S72). Next, the gateway 18 compares the transmission interval A with the first transmission interval which was calculated in step S72 (step S73). As a result of this comparison, the gateway 18 decides on the transmission interval having the longest interval length as the transmission interval B, and then transmits this transmission interval B to the wireless communication module 16 as a Flow Control which is created based on a CAN protocol (step S74).

When the wireless communication module 16 receives the Flow Control of the transmission interval B from the gateway 18, it delivers the divided updating data at transmission intervals corresponding to this transmission interval B to the vehicle on-board instrument 12 as Consecutive Frames which are created based on a CAN protocol (step S76). This divided updating data is delivered using the gateway 18 as a relay.

When the load of the vehicle on-board instrument 12 is high, then when the vehicle on-board instrument 12 receives the delivery of the divided updating data relayed through the gateway 18 from the wireless communication module 16 in the above-described step S70, the vehicle on-board instrument 12 once again determines its own processing load and recalculates the second transmission interval. The vehicle on-board instrument 12 then transmits the second transmission interval to the gateway 18 as a Flow Control which is created based on a CAN protocol (step S78).

When the gateway 18 receives the Flow Control of the second transmission interval from the vehicle on-board instrument 12, it compares this second transmission interval with the transmission interval A (step S80). As a result of this comparison, the gateway 18 decides on the transmission interval having the longest interval length as the transmission interval B, and then transmits this transmission interval B to the wireless communication module 16 as a Flow Control which is created based on a CAN protocol (step S82).

When the wireless communication module 16 receives the Flow Control of the transmission interval B from the gateway 18, it divides the remaining divided updating data and then delivers it at the transmission intervals B to the vehicle on-board instrument 12 as Consecutive Frames which are created based on a CAN protocol (step S84). This divided updating data is delivered using the gateway 18 as a relay.

Once the installation of the divided updating data has been completed, the vehicle on-board instrument 12 notifies the gateway 18 that the installation has been completed (step S86).

When the gateway 18 receives the notification from the vehicle on-board instrument 12 that the installation has been completed, it sends a notification to the vehicle on-board instrument 12 instructing the vehicle on-board instrument 12 to perform control after switching to the updating data (step S88).

When the vehicle on-board instrument 12 receives the switching instruction notification from the gateway 18, it implements switching settings (step S90). Once these switching settings have been implemented, the vehicle on-board instrument 12 notifies the gateway 18 that the switch has been completed (step S92).

When the gateway 18 receives the notification from the vehicle on-board instrument 12 that the switch has been completed, it transmits this notification to the wireless communication module 16 (step S94).

When the wireless communication module 16 receives the notification that the switch has been completed from the gateway 18, it notifies the communication center 20 that the switch has been successful (step S96).

When the communication center 20 receives the notification from the wireless communication module 16 informing it that the switch has been successful, the communication center 20 updates the vehicle on-board instrument control program information for the vehicle on-board instrument 12, and sends a response to the wireless communication module 16 informing it that the updating processing has been completed (step S98).

Figure 8A:
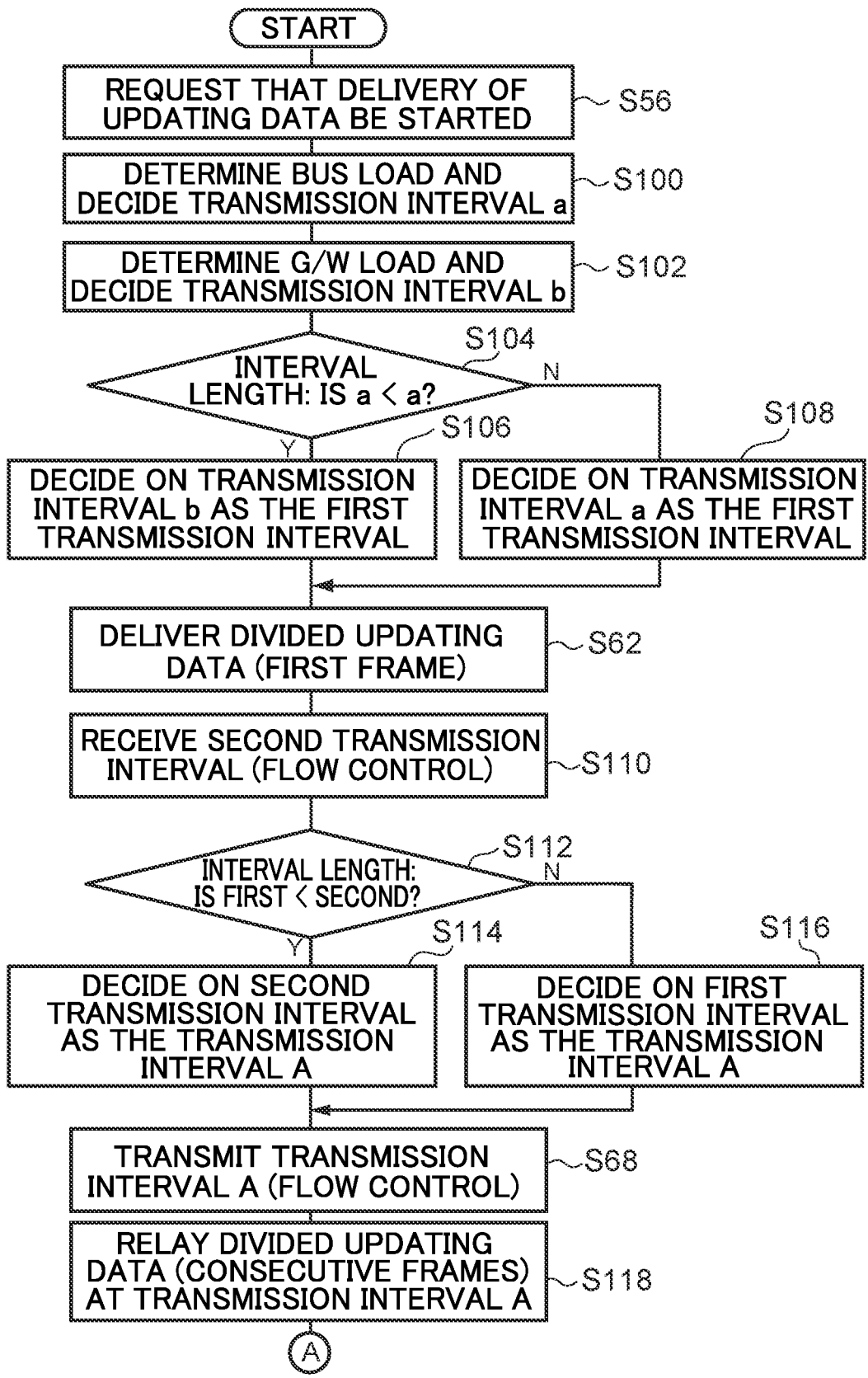

Next, the calculation of the transmission interval A by the gateway 18 will be described using the flowchart in FIGS. 8A and 8B. Note that processing which is the same as processing shown in the sequence diagrams in the above-described FIG. 6A, 6B and FIG. 7A, 7B is given the same descriptive symbol and a description thereof is omitted.

The CPU 28 of the gateway 18 determines the current load of the bus 22 which connects the vehicle on-board instrument 12 to the gateway 18 (hereinafter referred to as 'the subject bus 22') and, based on this load, decides on a transmission interval (hereinafter, this will be referred to as a 'transmission interval a' in order to distinguish it from other transmission intervals) that is within a permissible limit when divided updating data is being transmitted (step S100). Next, the CPU 28 determines the current processing load of the gateway 18 and, based on this load, decides on a transmission interval (hereinafter, this will be referred to as a 'transmission interval b' in order to distinguish it from other transmission intervals) that is within a permissible limit when divided updating data is being transmitted (step S102).

The CPU 28 then compares the interval lengths of the transmission interval a and the transmission interval b (step S104). If the interval length of transmission interval b is longer than that of transmission interval a (i.e., if the result in step S104 is YES), then the CPU 28 decides on the transmission interval b as the first transmission interval (step S106). If, however, the interval length of transmission interval a is longer than that of transmission interval b (i.e., if the result in step S104 is NO), then the CPU 28 decides on the transmission interval a as the first transmission interval (step S108).

When the CPU 28 receives the second transmission interval in step S64 shown in FIG. 7 from the vehicle on-board instrument 12 (step S110), it compares the interval lengths of the first transmission interval and the second transmission interval (step S112). If the interval length of the second transmission interval is longer than that of the first transmission interval (i.e., if the result in step S112 is YES), then the CPU 28 decides on the second transmission interval as the transmission interval A (step S114). If, on the other hand, the interval length of the first transmission interval is longer than that of the second transmission interval (i.e., if the result in step S112 is NO), then the CPU 28 decides on the first transmission interval as the transmission interval A (step S116).

When the CPU 28 receives the divided updating data in step S70 shown in FIG. 7 from the wireless communication module 16, it relays this divided updating data to the vehicle on-board instrument 12 at the transmission intervals A (step S118).

The CPU 28 determines which of the above-described 'the load is normal', 'the load of the gateway 18 is high or the load of the bus 22 is high', and 'the load of the vehicle on-board instrument 12 is high' the current state corresponds to from the interval length of the transmission interval A (step S120). If the load is normal, then the CPU 28 relays the remaining divided updating data to the vehicle on-board instrument 12 at the transmission intervals A (step S122). The CPU 28 then determines whether or not the delivery of the divided updating data has been completed (step S124). If the delivery has not yet been completed (i.e., if the result in step S124 is NO), then the CPU 28 returns the processing to step S122. If the delivery has been completed (i.e., if the result in step S124 is YES), then the CPU 28 ends the processing which is based on the data delivery program.

If the interval length of the transmission interval A is determined in step S120 to be substantially the same as that of the first transmission interval (i.e., if 'the load of the gateway 18 is high or the load of the bus 22 is high'), then the CPU 28 determines once again the current load of the subject bus 22, and decides on the transmission interval a once again (step S126). Next, the CPU 28 determines once again the current processing load of the gateway 18, and decides on the transmission interval b once again based on this processing load (step S128).

The CPU 28 then compares the interval lengths of the transmission interval a and the transmission interval b (step S130). If the interval length of transmission interval b is longer than that of transmission interval a (i.e., if the result in step S130 is YES), then the CPU 28 decides on (i.e., overwrites) the transmission interval b as the first transmission interval (step S132). If, however, the interval length of transmission interval a is longer than that of transmission interval b (i.e., if the result in step S130 is NO), then the CPU 28 decides on (i.e., overwrites) the transmission interval a as the first transmission interval (step S134).

The CPU 28 then compares the interval length of the transmission interval A with that of the first transmission interval in step S132 or step S134 (step S136). If the interval length of the first transmission interval is longer than that of transmission interval A (i.e., if the result in step S136 is YES), then the CPU 28 decides on the first transmission interval as the transmission interval B (step S138). If, however, the interval length of transmission interval A is longer than that of the first transmission interval (i.e., if the result in step S136 is NO), then the CPU 28 decides on the transmission interval A as the transmission interval B (i.e., replaces the transmission interval B with the transmission interval A) (step S140).

The CPU 28 then relays the remaining divided updating data to the vehicle on-board instrument 12 at the transmission intervals B that were transmitted in step S74 (step S142). The CPU 28 then determines whether or not the delivery of the divided updating data has been completed (step S144). If the delivery has not yet been completed (i.e., if the result in step S144 is NO), then the CPU 28 returns the processing to step S142. If the delivery has been completed (i.e., if the result in step S144 is YES), then the CPU 28 ends the processing which is based on the data delivery program.

If the interval length of the transmission interval A is determined in step S120 to be substantially the same as that of the second transmission interval (i.e., if 'the load of the vehicle on-board instrument 12 is high'), then when the CPU 28 receives the second transmission interval that was decided once again in step S78 shown in FIG. 7 from the vehicle on-board instrument 12 (step S148), the CPU 28 compares the interval length of the second transmission interval with that of the transmission interval A (step S150). If the interval length of the second transmission interval is longer than that of transmission interval A (i.e., if the result in step S150 is YES), then the CPU 28 decides on the second transmission interval as the transmission interval A (step S152), and the routine moves to step S74. If, however, the interval length of transmission interval A is longer than that of the second transmission interval (i.e., if the result in step S152 is NO), then the CPU 28 decides on the transmission interval B for the transmission interval A (i.e., replaces the transmission interval A with the transmission interval B) (step S154), and the routine moves to step S74.

The flow of updating processing performed for the vehicle on-board instrument 12 has been described above, however, it is to be understood that the same type of processing can be employed for the updating processing for the vehicle on-board instrument 14 as well.

(Actions and Effects)

Next, actions and effects of the present exemplary embodiment will be described.

In the present exemplary embodiment, the vehicle on-board communication device 10 has the vehicle on-board instruments 12 and 14, the wireless communication module 16, the gateway 18, the communication line load transmission interval deciding unit 50, the instrument load transmission interval deciding unit 52, and the delivery control unit 48. The vehicle on-board instruments 12 and 14 are mounted in the vehicle 24, are connected to the bus 22, and also have the data storage unit 54 in which data is stored. The wireless communication module 16 acquires divided updating data. The divided updating data is created by dividing updating data that is used to update the data stored in the storage unit 54 of the vehicle on-board instruments 12 and 14. The gateway 18 delivers the divided updating data acquired by the wireless communication module 16 to the vehicle on-board instruments 12 and 14 via the bus 22. When this divided updating data is being delivered, the delivery control unit 48 controls the transmission intervals of the divided updating data. More specifically, the communication line load transmission interval deciding unit 50 decides on the transmission interval from the load of the bus 22. In contrast, the instrument load transmission interval deciding unit 52 decides on the transmission interval from the processing loads of at least one of the vehicle on-board instruments 12 and 14 and the gateway 18. Next, the delivery control unit 48 compares the transmission interval decided on by the communication line load transmission interval deciding unit 50 with the transmission interval decided on by the instrument load transmission interval deciding unit 52, and performs control so that the divided updating data is delivered whichever of these transmission intervals has the longer interval length. Accordingly, because the transmission interval is decided based not only on the load of the bus 22, but also on the processing loads of the vehicle on-board instruments 12 and 14 and of the gateway 18, it is possible to inhibit a delay in the transmission of control data which is required in order for the vehicle 24 to travel that is caused by the delivery of the divided updating data.

Moreover, after the gateway 18 has delivered a portion of the divided updating data, the instrument load transmission interval deciding unit 52 once again decides on the transmission interval of the divided updating data from the processing loads of at least one of the vehicle on-board instruments 12 and 14 and the gateway 18, and the delivery control unit 48 compares the transmission interval A of the divided updating data after the partial delivery (see step S70 in FIG. 7) with the transmission interval decided on once again by the instrument load transmission interval deciding unit 52, and performs control so that the divided updating data is delivered at whichever of these transmission intervals has the longer interval length. Accordingly, even if the processing load of at least one of the vehicle on-board instruments 12 and 14 and the gateway 18 increases as a result of the divided updating data being delivered, because it is possible to alter the transmission interval in accordance with this, it is possible to inhibit a delay in the transmission of control data which is required in order for the vehicle 24 to travel that is caused by the delivery of the divided updating data.

Furthermore, after the gateway 18 has delivered a portion of the divided updating data, the communication line load transmission interval deciding unit 50 once again decides on the transmission interval of the divided updating data from the load of the bus 22, and the delivery control unit 48 compares the transmission interval A of the divided updating data after the partial delivery (see step S70 in FIG. 7) with the transmission interval decided on once again by the communication line load transmission interval deciding unit 50, and performs control so that the divided updating data is delivered at whichever of these transmission intervals has the longer interval length. Accordingly, even if the load of the bus 22 increases as a result of the divided updating data being delivered, because it is possible to alter the transmission interval in accordance with this, it is possible to inhibit a delay in the transmission of control data which is required in order for the vehicle 24 to travel that is caused by the delivery of the divided updating data. As a consequence, updating processing can be performed without this having any effect on the operation of the vehicle 24.

Furthermore, because the wireless communication module 16 acquires divided updating data wirelessly, there is no need to stop the vehicle 24 when acquiring the divided updating data. Because of this, it is also possible for divided updating data to be acquired while the vehicle 24 is traveling. As a consequence, updating processing can be performed easily.

Second Exemplary Embodiment

Next, a vehicle on-board communication device according to a second exemplary embodiment of the present disclosure will be described using FIG. 9. Note that component elements that are the same as in the above-described first exemplary embodiment are given the same descriptive numbers and a repeated description thereof is omitted.

A vehicle on-board communication device 70 according to the second exemplary embodiment has the same basic structure as that of the first exemplary embodiment, but differs in that the updating data is delivered via a wire.

Figure 9:
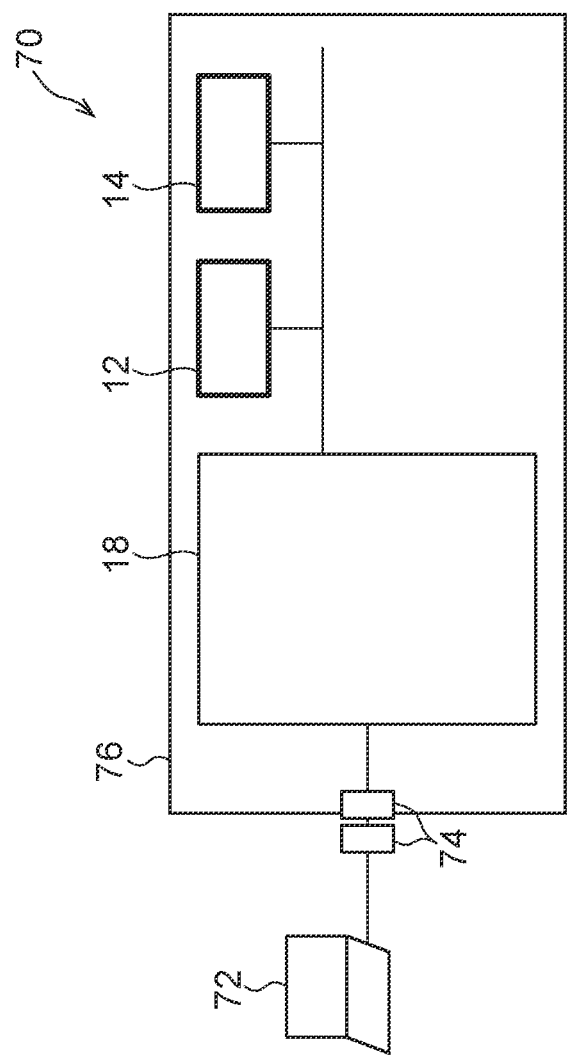
FIG. 9 is a schematic view showing an outline of a vehicle on-board communication device according to a second exemplary embodiment.

In other words, as is shown in FIG. 9, the vehicle on-board communication device 70 has the plural vehicle on-board instruments 12 and 14, a repro tool 72, and the gateway 18. The repro tool 72 is provided externally of a vehicle 76, and is able to be connected thereto using a cable via the gateway 18 and a connector 74.

The repro tool 72 is provided in advance with updating data, and is capable of delivering divided updating data, which is created by dividing updating data, at a transmission interval notified by the gateway 18.

(Actions and Effects of the Second Exemplary Embodiment)

Next, actions and effects of the second exemplary embodiment will be described.

In the above-described structure as well, other than the updating data being delivered via a cable, the same structure as in the vehicle on-board communication device 10 of the first exemplary embodiment is employed. Because of this, the same types of effects are obtained as from the first exemplary embodiment. Additionally, because the updating data is delivered via a cable, this means that the wireless communication module 16 is no longer necessary. As a consequence, the structure on the vehicle 24 side in the vehicle on-board communication device 70 can be simplified.

Note that, in the present exemplary embodiment, a structure is employed in which the transmission interval is decided on from the processing loads of the gateway 18 and the vehicle on-board instruments 12 and 14, however, the present disclosure is not limited to this, and it is also possible to employ a structure in which the processing loads of devices other than these such as the wireless communication module 16 and the like are acquired, and the transmission interval is decided on from these processing loads as well in addition to those described above. Moreover, it is also possible to employ a structure in which the transmission interval is decided on from at least one of the processing loads of the wireless communication module 16, the gateway 18, and the vehicle on-board instruments 12 and 14, and from the load of the bus 22.

In addition, a structure is employed above in which, after comparing the transmission intervals, the CPU 28 employs the transmission interval having the longest interval length, and delivers the divided updating data at this transmission interval having the longest interval length, however, the present disclosure is not limited to this, and it is also possible to employ a structure in which a predetermined interval is added to the longest transmission interval, and the divided updating data is then delivered at this extended transmission interval.

Furthermore, a structure is employed above in which the delivery control unit 48 compares the transmission interval decided on by the communication line load transmission interval deciding unit 50 with the transmission interval decided on by the instrument load transmission interval deciding unit 52, and performs control so that the divided updating data is delivered at whichever of these transmission intervals has the longer interval length, however, the present disclosure is not limited to this, and it is also possible for control to be performed so that the divided updating data is only delivered at the transmission interval decided on by the instrument load transmission interval deciding unit 52. More specifically, the delivery control unit 48 performs control so that the divided updating data is delivered at a transmission interval that is equal to or greater than the transmission interval decided on by the instrument load transmission interval deciding unit. As a result, while employing a comparatively simple structure, it is possible to inhibit a delay in the transmission of control data that is needed for a vehicle to travel that is caused by the delivery of the divided updating data.

Furthermore, a structure is employed above in which, after the gateway 18 has delivered a portion of the divided updating data, the instrument load transmission interval deciding unit 52 once again decides on the transmission interval of the divided updating data from the processing loads of at least one of the vehicle on-board instruments 12 and 14 and the gateway 18, however, the present disclosure is not limited to this, and it is also possible to employ a structure in which a decision is not once again made about the transmission interval of the divided updating data. In the same way, a structure is employed above in which, after the gateway 18 has delivered a portion of the divided updating data, the communication line load transmission interval deciding unit 50 once again decides on the transmission interval of the divided updating data from the load of the bus 22, however, the present disclosure is not limited to this, and it is also possible to employ a structure in which a decision is not once again made about the transmission interval of the divided updating data.

Additionally, a structure is employed above in which when the gateway 18 (i.e., the delivery control unit 48) receives the divided updating data from the wireless communication module 16, the gateway 18 determines its own processing load once again and also determines the load of the bus 22 once again, and then recalculates the first transmission interval. In other words, the respective transmission intervals that have been decided on once again by the communication line load transmission interval deciding unit 50 and the instrument load transmission interval deciding unit 52 are mutually compared with each other, and the transmission interval whose interval length is the longest is decided on as the first transmission interval. In addition, this first transmission interval is then compared with the transmission interval A of the divided updating data after the partial delivery (see step S70 in FIG. 7), and the relay unit 47 is then controlled so that the remaining divided updating data is delivered at transmission intervals which are equal to or greater than the longer of these transmission intervals. However, the present disclosure is not limited to this, and it is also possible to employ a structure in which the transmission interval of just one of the communication line load transmission interval deciding unit 50 and the instrument load transmission interval deciding unit 52 is decided on once again, and this transmission interval which has been decided once again is set as the first transmission interval. This first transmission interval is then compared with the transmission interval A of the divided updating data after the partial delivery, and the relay unit 47 is then controlled so that the remaining divided updating data is delivered at transmission intervals which are equal to or greater than the longer of these transmission intervals.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A vehicle on-board communication device comprising:
   an acquisition unit that acquires divided updating data that is created by dividing updating data which updates data stored in an updating-target vehicle on-board instrument out of a plurality of vehicle on-board instruments that are mounted in a vehicle;
   a relay unit that delivers the divided updating data acquired by the acquisition unit to the updating-target vehicle on-board instrument via a communication line;
   an instrument load transmission interval deciding unit that determines a processing load based on at least one of a processing state of one of the plurality of vehicle on-board instruments, a processing state of the acquisition unit, or a processing state of the relay unit, and selects a transmission interval for the divided updating data based on this processing load; and
   a communication line load transmission interval deciding unit that determines a load of the communication line based on a communication state of the communication line, and selects a transmission interval for the divided updating data based on this load; and
   a delivery control unit that compares the transmission interval selected by the communication line load transmission interval deciding unit with the transmission interval selected by the instrument load transmission interval deciding unit, and controls the relay unit such that the divided updating data is delivered to the updating-target vehicle on-board instrument at a transmission interval that is equal to or greater than the longer of these transmission intervals.

2. A vehicle on-board communication device comprising:
   a plurality of vehicle on-board instruments that are mounted in a vehicle;
   an acquisition unit that acquires divided updating data that is created by dividing updating data which updates data stored in an updating-target vehicle on-board instrument out of the plurality of vehicle on-board instruments;
   a relay unit that delivers the divided updating data acquired by the acquisition unit to the updating-target vehicle on-board instrument;
   an instrument load transmission interval deciding unit that determines a processing load based on at least one of a processing state of one of the plurality of vehicle on-board instruments, a processing state of the acquisition unit, or a processing state of the relay unit, and selects a transmission interval for the divided updating data based on this processing load, and determines a new processing load by again acquiring the processing load based on at least one of a processing state of one of the plurality of vehicle on-board instruments, a processing state of the acquisition unit, or a processing state of the relay unit after the relay unit has delivered a portion of the divided updating data, then again selects the transmission interval for the divided updating data based on this new processing load; and
   a delivery control unit that compares the transmission interval after the divided updating data has been delivered with the transmission interval that is selected again by the instrument load transmission interval deciding unit, and controls the relay unit such that the remaining divided updating data is delivered to the updating-target vehicle on-board instrument at a transmission interval that is equal to or greater than the longer of these transmission intervals.

3. The vehicle on-board communication device according to claim 1, wherein
   the instrument load transmission interval deciding unit determines a new processing load by again acquiring the processing load based on at least one of a processing state of one of the vehicle on-board instruments, a processing state of the acquisition unit, or a processing state of the relay unit after the relay unit has delivered a portion of the divided updating data, and then again selects the transmission interval for the divided updating data based on this new processing load, and
   the delivery control unit compares the transmission interval for the divided updating data after the divided updating data has been partially delivered with the transmission interval selected again by the instrument load transmission interval deciding unit, and controls the relay unit such that the remaining divided updating data is delivered to the updating target vehicle on-board instrument at a transmission interval that is equal to or greater than the longer of these transmission intervals.

4. The vehicle on-board communication device according to claim 1, wherein
   the communication line load transmission interval deciding unit determines the load of the communication line by again acquiring the communication state of the communication line after the relay unit has delivered a portion of the divided updating data, and again selects the transmission interval for the divided updating data based on this load, and a delivery control process compares the transmission interval for the divided updating data after the divided updating data has been partially delivered with the transmission interval selected again by the communication line load transmission interval deciding unit, and controls the relay unit such that the remaining divided updating data is delivered to the updating target vehicle on-board instrument at a transmission interval that is equal to or greater than the longer of these transmission intervals.

5. The vehicle on-board communication device according to claim 1, wherein
the acquisition unit acquires the divided updating data wirelessly.

6. The vehicle on-board communication device according to claim 2, wherein
the acquisition unit acquires the divided updating data wirelessly.

7. The vehicle on-board communication device according to claim 3, wherein
the acquisition unit acquires the divided updating data wirelessly.

8. The vehicle on-board communication device according to claim 4, wherein
the acquisition unit acquires the divided updating data wirelessly.

9. A communication method comprising:
acquiring, by an acquisition unit, divided updating data that is created by dividing updating data which updates data stored in an updating-target vehicle on-board instrument out of a plurality of vehicle on-board instruments that are mounted in a vehicle;

delivering, by a relay unit, the divided updating data acquired by the acquisition unit to the updating-target vehicle on-board instrument via a communication line;

determining, by an instrument load transmission interval deciding unit, a processing load based on at least one of a processing state of one of the plurality of vehicle on-board instruments, a processing state of the acquisition unit, or a processing state of the relay unit, and selecting a transmission interval for the divided updating data based on this processing load; and determining, by a communication line load transmission interval deciding unit, a load of the communication line based on a communication state of the communication line, and selecting a transmission interval for the divided updating data based on this load; and comparing, by a delivery control unit, the transmission interval selected by the communication line load transmission interval deciding unit with the transmission interval selected by the instrument load transmission interval deciding unit, and controlling the relay unit such that the divided updating data is delivered to the updating-target vehicle on-board instrument at a transmission interval that is equal to or greater than the longer of these transmission intervals.

* * * * *